(12) United States Patent
Butta

(10) Patent No.: US 7,811,045 B2
(45) Date of Patent: Oct. 12, 2010

(54) TILT RACK

(76) Inventor: Mark Butta, 392 Railroad Ave., Manorville, NY (US) 11949

( * ) Notice: Subject to any disclaimer, the term of this patent is extended or adjusted under 35 U.S.C. 154(b) by 358 days.

(21) Appl. No.: 12/072,087

(22) Filed: Feb. 23, 2008

(65) Prior Publication Data

US 2008/0206031 A1 Aug. 28, 2008

Related U.S. Application Data

(60) Provisional application No. 60/903,227, filed on Feb. 23, 2007.

(51) Int. Cl.
*B60P 9/00* (2006.01)
*B60R 9/00* (2006.01)

(52) U.S. Cl. .................. 414/462; 414/469; 414/494; 224/509

(58) Field of Classification Search ............ 224/502, 224/505–509, 524; 254/323; 298/17.7, 18, 298/38; 414/425, 462, 469–470, 480, 491, 414/494, 538, 559; 108/7; D12/406
See application file for complete search history.

(56) References Cited

U.S. PATENT DOCUMENTS

| | | | | |
|---|---|---|---|---|
| 789,784 A * | 5/1905 | Balch | ........................ | 298/18 |
| 2,611,641 A * | 9/1952 | Stockwell | ..................... | 298/18 |
| 3,797,681 A * | 3/1974 | Brettrager | ................... | 414/559 |
| 4,381,069 A * | 4/1983 | Kreck | ......................... | 224/502 |
| 4,705,448 A * | 11/1987 | Mungons | .................... | 414/462 |
| 4,934,894 A * | 6/1990 | White | ......................... | 414/462 |
| 5,492,454 A * | 2/1996 | Colyer | ....................... | 414/462 |
| 5,662,451 A * | 9/1997 | Muzzi et al. | ................ | 414/540 |
| 5,862,966 A * | 1/1999 | Mehls | ......................... | 224/504 |
| 5,899,655 A * | 5/1999 | Miller et al. | ................ | 414/462 |
| 7,407,149 B1 * | 8/2008 | Zindell | ....................... | 254/323 |
| 2006/0045677 A1 * | 3/2006 | Garfield et al. | ............ | 414/340 |

* cited by examiner

*Primary Examiner*—Gregory W Adams
(74) *Attorney, Agent, or Firm*—Harold G. Furlow, Esq.

(57) ABSTRACT

A rack for vehicular applications is described that has a frame that is connected to a beam by a continuous hinge. In a first position the rack is approximately aligned with the ground surface and in a second position one side of the frame is in proximity to the ground. The rack includes a removable winch that that has an operational position and a stowed position under the rack. The winch is movable between the operational position and the stowed position. The height of the winch mechanism can vary relative to the plane defined by the frame.

16 Claims, 9 Drawing Sheets

FIG. 2

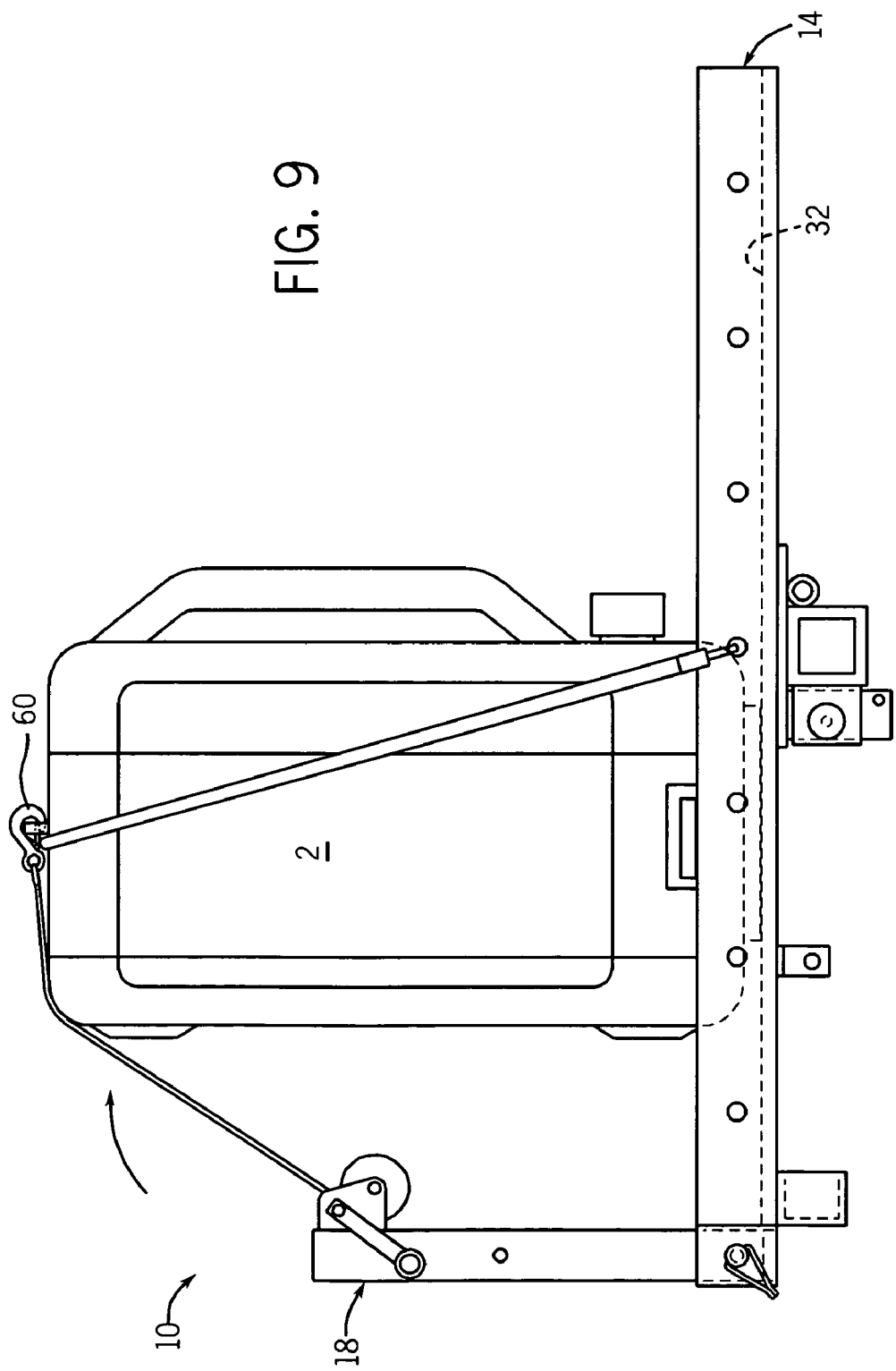

TILT RACK

FIELD OF THE INVENTION

This application claims priority to provisional application 60/903,227 filed Feb. 23, 2007, the disclosure of which is incorporated by reference herein and made a part of this application.

BACKGROUND OF THE INVENTION

1. Field of the Invention

The present invention relates to vehicular racks for the transportation of goods and in particular to removable racks for vehicles that can actively assist the loading and unloading of goods.

2. Description of the Related Art

Racks that interface with trailer hitches can be advantageously connected and disconnected and removed from the vehicle. These racks commonly tilt and includes ramps that accommodate the rolling on and off of wheeled articles such as lawn mowers and motorcycles. These same racks, however, are limited in their ability to actively aid the loading and unloading of the rack. This is particularly disadvantageous under conditions such as when there is a severe side slope, the rack is slick or the article itself cannot be readily moved onto the rack because of its weight and/or its lack of wheels, for example. This kind of article can include game, heavier articles such as powered wheelchairs or lawn care devices.

A vehicular rack is needed that can assist the loading, unloading and lifting of articles relative to the rack in a safe and controlled manner under a variety of conditions.

SUMMARY OF THE INVENTION

A tilt rack is described that is adapted to couple with a hitch of a vehicle that is positioned on the ground. The tilt rack comprises an elongate beam, a frame, a winch assembly and a hinge. The beam is adapted to couple with a hitch of a vehicle. The frame includes opposed support members that define a perimeter of the frame and are connected to a bottom. The frame approximately defines a plane. A receptacle is connected to a first portion of one of the support members of the frame.

The winch assembly includes a post and a winch mechanism. The post has a first end portion and an opposed second end portion. The winch mechanism is connected in proximity to the second end portion of the post. The winch has an operational position and a stowed position. The operational position of the winch includes the first end portion of the post connected to the receptacle and the post extends approximately perpendicular to and above the bottom. The winch mechanism is positioned for providing a pulling force approximately perpendicular to the beam and for providing an approximately vertical hoisting force. The winch is selectively removable from the frame.

A hinge of the tilt rack is approximately aligned with the beam and directly connects the beam and the frame for the rotation of the frame relative to the beam. The tilt rack has a first position wherein the frame is approximately aligned with the ground and a second position wherein the frame is tilted from the first position about the hinge and relative to the beam such that the portion of the frame opposite the first portion of the frame is in proximity to the ground.

The tilt rack has a locking mechanism that includes a first proximal flange and a second proximal flange. The first proximal flange is connected to the beam and the second proximal flange is connected to the frame. The first proximal flange has a first aperture and the second proximal flange has at least two apertures. A rod positionable through the aperture of the first proximal flange and into one of the apertures of the second proximal flange to fix the position of the frame relative to the beam.

The frame includes a plate that is approximately aligned with the beam and extends between the frame members. The plate is directly connected to the hinge. The hinge has a length that extends approximately between the frame members.

The winch in the stowed position is removed from the receptacle and positioned in a second receptacle that retains the winch in the stowed position. The winch mechanism is adjustable in height above the plane defined by the bottom. The winch is secured in the stowed position by a second receptacle and a channel. The second receptacle and channel are positioned under the frame. The receptacle includes a hinge that connects to the post of the winch and the winch rotates between the operational position and the stowed position. The winch can be coupled to a source of electrical power and operated electrically.

A tilt rack is described that comprises an elongate beam, a frame, a winch and a hinge. The beam is adapted to couple with a hitch of a vehicle. The frame includes a first side member opposed to a second side member, a front member and a back member. The side members connect the front member and the opposed back member. The side members have a first length and the front and back member have a second length. The first length of the side members is less than the second length of the front member and the back member. The frame includes a receptacle that is connected to a first side member. The frame includes a bottom that is connected to the frame members. The frame defines a plane.

The winch assembly includes an elongate post and a winch assembly. The post has a first end portion and an opposed second end portion. The winch mechanism is selectively movable along the length of the post. The winch has an operational position wherein the first end portion of the post is positioned in the receptacle and the post extends approximately perpendicular to and above the bottom. The winch mechanism is positioned for providing a pulling force approximately perpendicular to the beam and the winch mechanism positioned for providing a vertical hoisting force. The winch is selectively movable between the operational position and a stowed position. The winch is quickly connected to and disconnected from the frame.

The tilt rack includes a hinge that is approximately aligned with the beam. The hinge is directly connected to the beam and to the frame for the rotation of the frame relative to the beam. The tilt rack has a first position wherein the frame is approximately aligned with the ground and a second position wherein the frame is tilted from the first position about the hinge and relative to the beam such that the second side member is in proximity to the ground and the first side member is elevated from the first position.

The tilt rack also includes a locking mechanism that includes a first proximal flange connected to the beam and a second proximal flange connected to the frame. The first proximal flange has a first aperture and the second proximal flange has at least two apertures. The first proximal flange and second proximal flange are aligned approximately perpendicular to the hinge and positioned in proximity. A rod is connected to the first proximal rod and is biased to an extended position. The rod is urged to extend through the aperture of the first proximal flange and to automatically engage the apertures of the second proximal flange and fix the position of the frame relative to the beam.

The frame can also include a first distal flange and a second distal flange. The first distal flange is connected to the beam and the second proximal flange is connected to the frame. The first distal flange and the second distal flange are approximately aligned and perpendicular to the hinge. The distal flanges are positioned in close proximity.

The receptacle can include a hinge that connects to the post and the winch rotates about the hinge from the operational position to the stowed position. The stowed position is under the frame. The winch mechanism includes a locking mechanism that secures the winch in the operational position and the stowed position. The locking mechanism of the winch automatically engages upon positioning the winch in the operational position and the stowed position. The connection between the first receptacle and the post of the winch accommodates approximately aligning the winch with the axis defined by the beam for providing a pulling force approximately aligned with the beam and an approximately vertical hoisting force. The post can be angled transverse to a vertical axis when the tilt rack is in the first position and can be selectively positioned to extend directly over at least a portion of the frame.

A tilt rack is described that comprises an elongate beam, a frame, a winch and a hinge. The beam is adapted to couple with a hitch of a vehicle. The frame includes a first side member opposed to a second side member. The side members connect a front and a back member. The side members have a first length and the front and back member have a second length. The first length of the side members is less than the second length of the front member and the back member. The frame has an approximately rectangular shape. A plate connects the front and back member. The frame includes a receptacle connected to a first side member for the winch in the operational position. The frame includes a bottom connected to the members and the frame defines a plane.

The winch assembly includes an elongate post and a winch mechanism. The post has a first end portion and an opposed second end portion. The winch mechanism is movable along the length of the post. An operational position of the winch includes the post extending approximately perpendicular to and above the bottom. The winch mechanism positioned above the plane of the frame for providing a pulling force approximately perpendicular to the beam and the winch mechanism positioned for providing a vertical hoisting force. The first end portion of the post pivotally connected to the receptacle and the winch selectively pivots between the operational position and a stowed position.

The tilt rack includes a hinge that is approximately aligned with the beam and directly connects the beam and the frame for the rotation of the frame relative to the beam. The tilt rack has a first position wherein the frame is approximately aligned with the ground and a second position wherein the frame is tilted from the first position about the hinge and relative to the beam such that the second side member is in proximity to the ground and the first side member is elevated.

The tilt rack includes a locking mechanism that includes a first proximal flange connected to the beam and a second proximal flange connected to the frame. The first proximal flange has a first aperture and the second proximal flange has at least two apertures. A rod biased to an extended position is connected to the first proximal flange. The rod is urged to extend through the aperture of the first proximal flange and into one of the apertures of the second proximal flange to fix the position of the frame relative to the beam.

The tilt rack can have an alignment mechanism for the frame that includes a first distal flange and a second distal flange. The first distal flange is connected to the beam and the second proximal flange is connected to the frame. The first distal flange is directly facing the second distal flange. The distal flanges are approximately aligned perpendicular to the hinge and positioned in sliding relation such that the flanges are approximately in continuous contact between the first and second positions of the tilt rack. The distal flanges include at least one aperture that can receive a detachable security mechanism. The connection between the receptacle and the post of the winch also accommodates approximately aligning the winch with the axis defined by the beam for providing a pulling force approximately aligned with the beam and an approximately vertical hoisting force. The connection of the winch in the stowed position to the frame includes a channel that is connected to the underside of the frame. The channel includes a locking mechanism. The receptacle and channel include automatic locking mechanisms such that the tilt rack is automatically locked in position upon being received into the receptacle and channel.

BRIEF DESCRIPTION OF THE DRAWINGS

Preferred embodiments of the present disclosure are described below with reference to the drawings, wherein like numerals are used to refer to the same or similar elements.

FIG. 2 is a bottom view of the tilt rack of FIG. 1 with the winch in a stowed position.

FIG. 9 is the front view of the tilt rack of FIG. 8 with the exemplary object repositioned with the assistance of the winch.

DETAILED DESCRIPTION OF THE INVENTION

Figure 1:
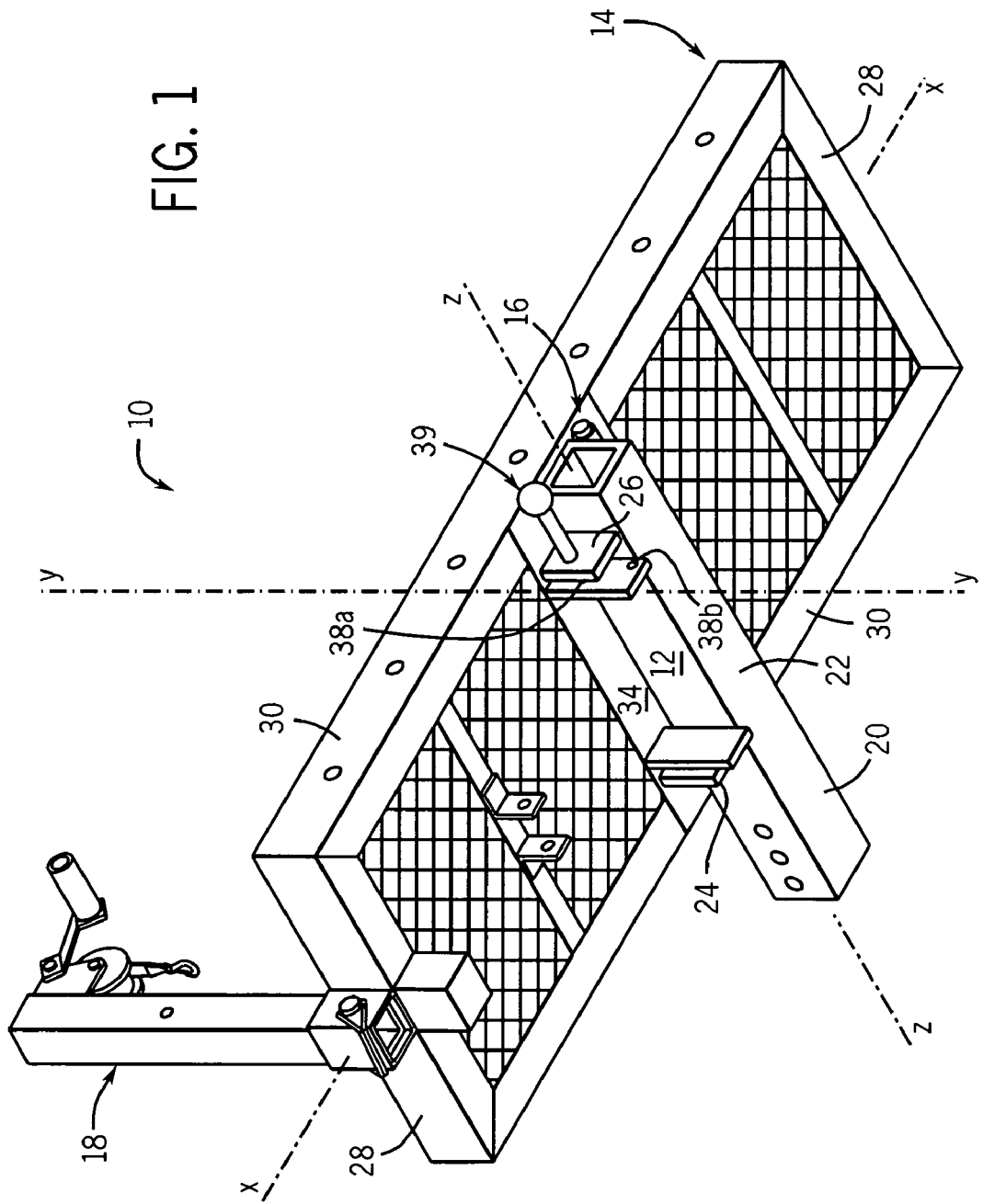
FIG. 1 is a bottom, front and side perspective view of a tilt rack constructed in accordance with the present disclosure in a first position of the tilt rack with a winch in an operational position.

Referring to FIG. 1, a tilt rack 10 includes a beam 12, a frame 14, a hinge 16 and a winch assembly 18. Hinge 16 connects beam 12 and frame 14 in a rotating relationship. Beam 12 is adapted to connect to a vehicle such as an automobile or a truck. Tilt rack 10 has a first position for transporting and a second position for loading and unloading. In the first position frame 14 defines a longitudinal axis-X that is approximately parallel to a ground a surface upon which the vehicle is positioned. In the second position frame 14 has rotated and tilted about an axis-Z defined by hinge 16 to an angled or inclined position such that a portion of frame 14 is in proximity to the ground. An axis-Y is perpendicular to axes X and Z. Winch 18 is shown in a first operational position and is selectively connectable to frame 14 to aid in the loading, unloading and the lifting of objects relative to tilt rack 10. Winch 18 has a second stowed position below frame 14.

Beam 12 is a cantilevered beam that has a distal end portion 20 and a proximal end portion 22. Distal end portion 20 interfaces and provides a secure connection with the standard tongue of a vehicle. Proximal end portion 22 is fixedly connected to a first portion of hinge 16. In this preferred embodiment, beam 12 is a tubular box beam. Beam 12 includes a first distal flange 24 in fixed spaced relation to a second proximal flange 26. Flanges 24 and 26 are approximately parallel and aligned perpendicular to axis-Z.

Figure 2:
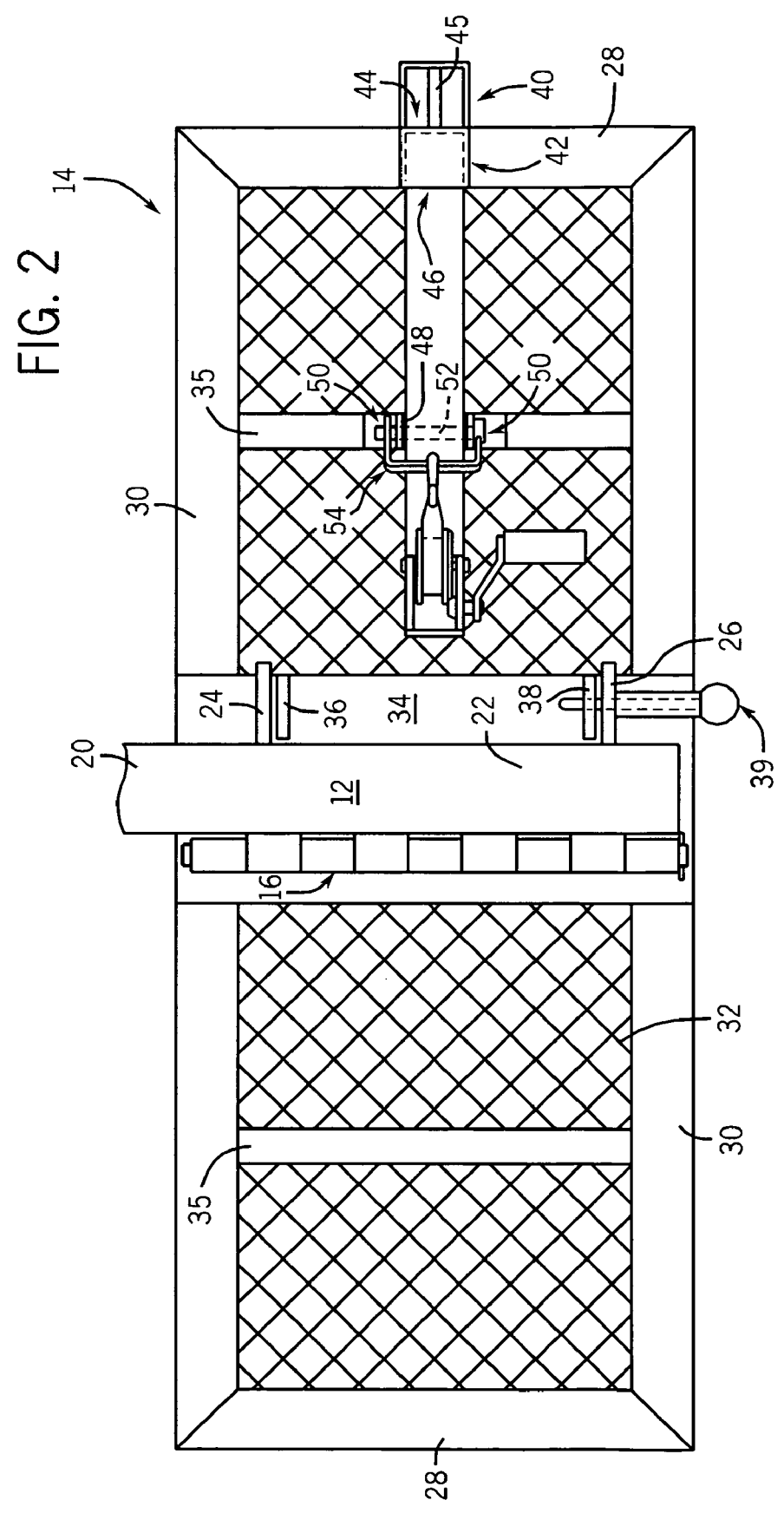
Figure 3:
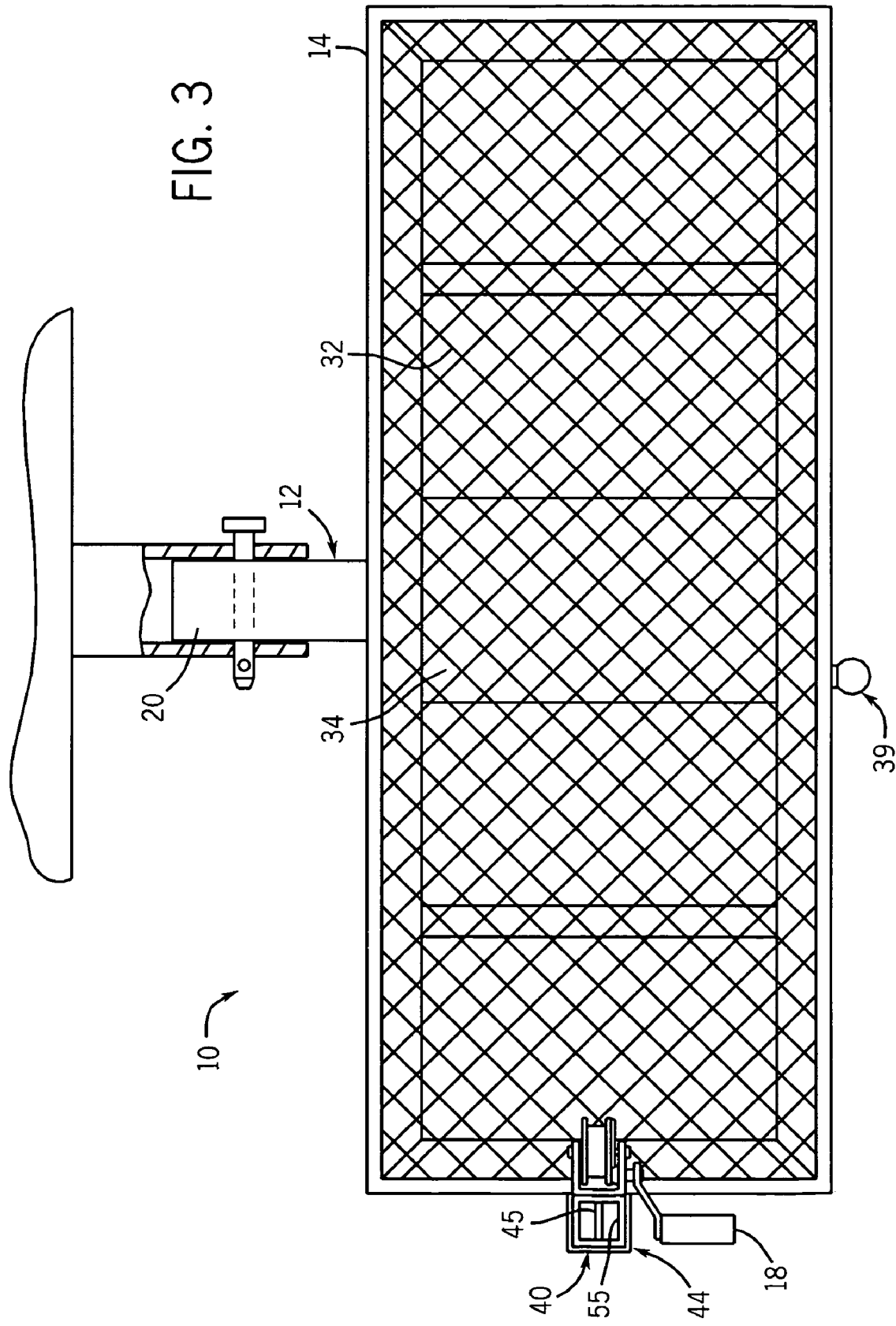
FIG. 3 is a top view of the tilt rack of FIG. 1.

As shown in FIGS. 2 and 3, frame 14 preferably has a rectangular shape that includes two first frame members 28, two opposed second frame members 30, a bottom 32 and at least one reinforcing plate 34. First frame members 28 are relatively narrow or have a first length that is less than a second length of second frame members 30. Frame members 28 and 30 preferably have the shape of angle irons. Bottom 32 is connected to frame members 28 and 30 and preferably to the lower bars of the angle irons. Bottom 32 is approximately aligned with the plane defined by axes X and Z. The upper bars of the angle irons of frame members 28 and 30 provide a rim or an abbreviated wall around the perimeter of frame 14. In this preferred embodiment, bottom 32 is a metal load bearing grate.

Plate 34 is preferably positioned in proximity to the center of and provides a fixed connection between second frame members 30. Frame 14 can also include additional reinforcing bars 35 such as those that extend between second frame members 30, for example. Plate 34 connects to the second portion of hinge 16 and includes a downwardly extending distal flange 36 and a downwardly extending proximal flange 38. Distal flange 36 is positioned in fixed spaced relation to proximal flange 38. Distal flange 36 is aligned approximately perpendicular to axis-Z and positioned in close proximity to distal flange 24 of beam 12. Proximal flange 38 of plate 34 is aligned approximately perpendicular to axis-Z and positioned in proximity to proximal flange 26 of beam 12.

Hinge 16 is preferably a piano type hinge that has alternating first tubular outer portions and second tubular outer portions connected by a close fitting rod. The first tubular outer portion is connected to beam 12 and the second outer tubular portion is preferably directly connected to plate 34 for the rotation of frame 14 relative to beam 12. Hinge extends the distance of plate 34 between frame members It is understood, that while this hinge system is a cylindrical bar in tube type configuration that provides a strong load bearing connection, additional hinge configurations are possible. In this preferred embodiment, the rod of hinge 16 is fabricated of stainless steel.

Referring now to FIGS. 1 and 2, tilt rack 10 can be selectively fixed in at least two positions. The first position and the second position are selected through the use of a locking mechanism that includes two apertures 38a and 38b in flange 38 and a spring-actuated rod 39 that is connected to flange 26. Spring rod 39 is biased to an extended position in which the rod is urged to extend at least through flange 26. In this preferred embodiment, spring rod 39 extends through aperture 38a of flange 26 when tilt rack 10 is securely positioned in the first position and aperture 38b of flange 26 when tilt rack 10 is tilted in the second position. Spring rod 39 has a close fitting relationship with apertures 38a and 38b that securely fixes tilt rack 10 in position.

Referring now to FIGS. 1-3, frame 14 includes a first operational receptacle 40 and a second storage receptacle 42 for winch 18. First receptacle 40 defines a through hole or aperture 44 and a stop 45. First receptacle 40 is connected to one of frame members 28 and preferably in proximity to the driver's side of the vehicle. Winch 18 in an operational or first position extends from receptacle 40 and is approximately aligned with axis-Y.

Second receptacle 42 defines an aperture 46. A pair of opposed approximately parallel flanges 48 define a channel 50 that is connected to the reinforcing bar 35 in proximity to receptacle 42. Flanges 48 are positioned in fixed spaced relation to form an open ended passageway approximately aligned with aperture 46. Channel 50 receives a pin 52 that securely positions winch 18 in a stowed position.

Figure 5:
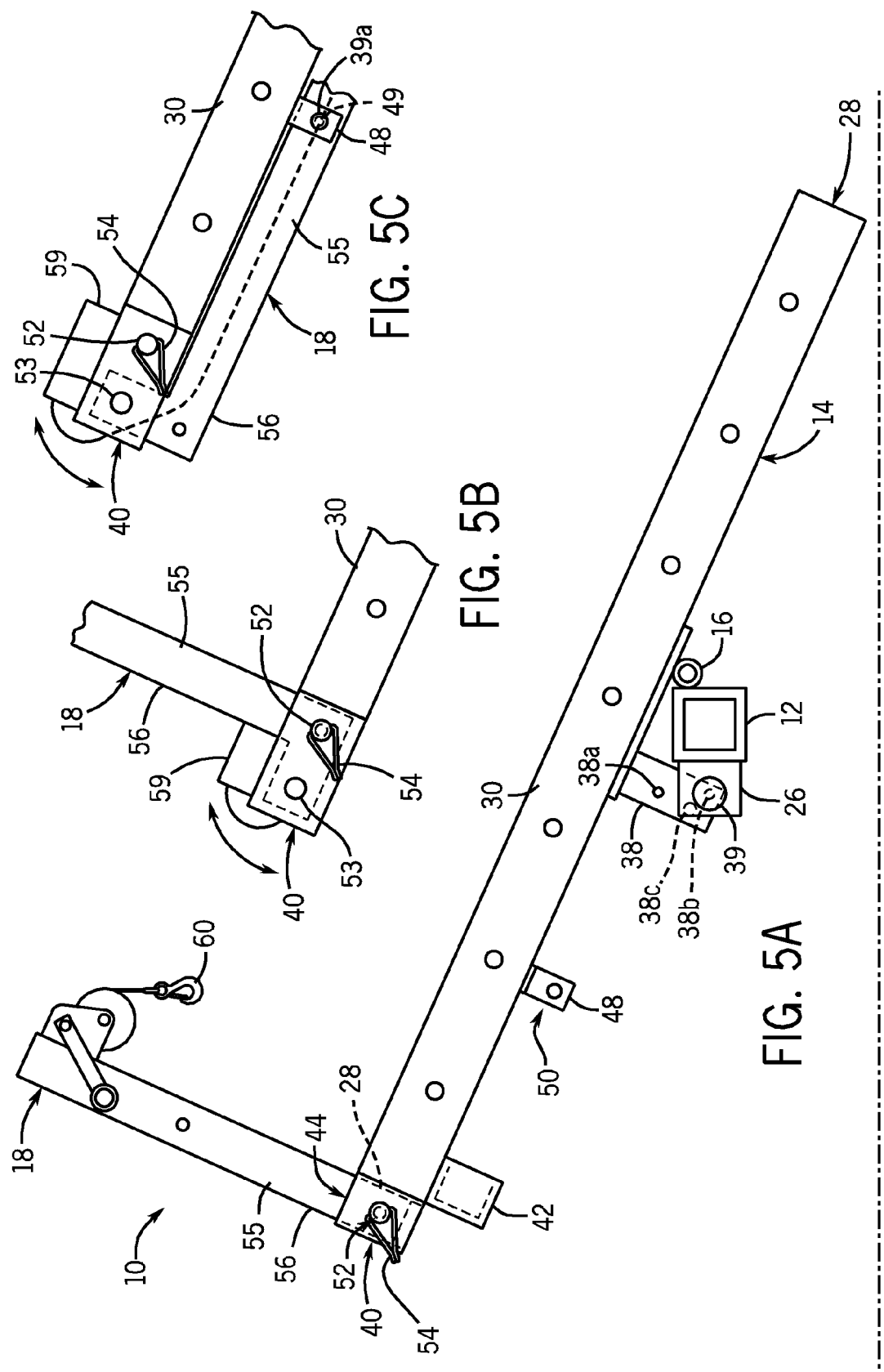
FIG. 5A is a front view of the tilt rack of FIG. 1 in a second position.
FIG. 5B is a close-up front view of one embodiment of the winch of tilt rack of FIG. 1 showing the winch in a first position, the winch connected to a hinge.
FIG. 5C is a close-up front view of the embodiment of the winch of FIG. 5B showing the winch in a second position.

As shown in FIGS. 5A, 5B and 5C, in one alternative embodiment of frame 14, receptacle 40 can be selectively pivoted between a first upright position and a second position for the stowage of winch 18. This alternative embodiment allows for a slight reduction in the weight of tilt rack 10 while supporting secure operational and stowed positions for winch 18.

In another alternative embodiment, first end portion 56 of post 55 is rotatingly connected to frame 14 such that winch 18 can be rotated between and secured in the operational position and the stowed position. In this embodiment post 55 is secured in the operational position to frame 14 by receptacle 40 that is a channel, for example, as described previously as channel 50 for post 55 in the stowed position. Each channel in this embodiment includes a locking mechanism that preferably automatically engages and secures winch 18 in position upon the positioning of post 55 in the respective receptacle 40 or channel 50. The locking mechanism can include devices such as a spring biased rod 39a similar to spring rod 39 or biased snap type locking device that is displaced by the insertion of post 55 and then secures winch 18 in the position automatically after insertion into receptacle 40 or channel 50.

Figure 4:
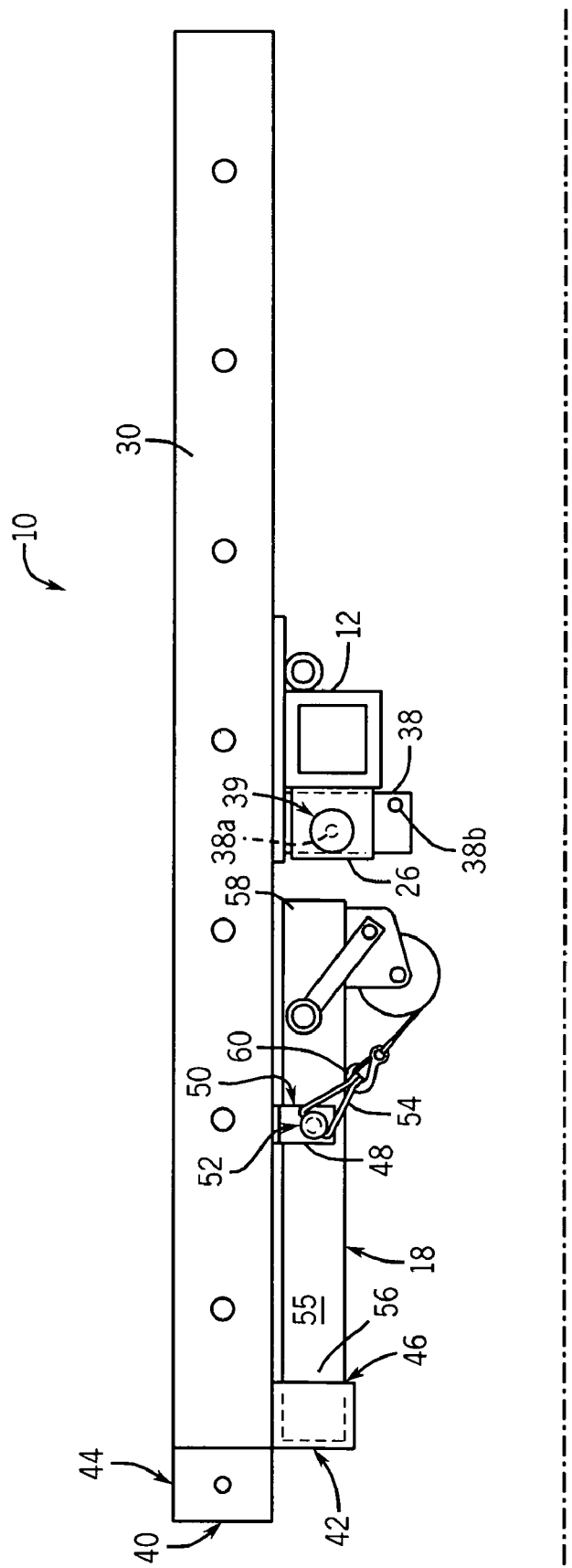
FIG. 4 is a front view of the tilt rack of FIG. 2.

As shown in FIGS. 2-4, winch assembly 18 includes a post 55 and a roller and crank or winch mechanism. Post 55 has a first end portion end 56 and an opposed second end portion 58. First end portion 56 is selectively positionable in receptacle 40 or receptacle 42. The winch mechanism is connected in proximity to second end portion 58. When winch 18 is in the stowed position, post 55 is positioned between flanges 48 of channel 50 and rod 52 extends through apertures in channel 50 and post 55 to secure winch 18 in position. Rod 52 is locked in this position using a pin 54. In this preferred embodiment, pin 54 is a biased U-shaped bracket that connects to the opposing ends of rod 52. The U-shaped pin 54 provides a convenient connection for the securing of a hook 60 at the terminal end of the strap of the winch mechanism.

In this preferred embodiment, post 55 positions the winch mechanism at a distance of approximately two feet from bottom 32. The winch mechanism is preferably a reel and crank system with a locking mechanism to selectively wind, unwind and fix the length of a flexible line. In this preferred embodiment, the line is a two-inch wide twenty-foot length of nylon strap, but it is understood that can include other forms of lines such as nylon rope, metal wire, cord or cable. Winch 18 in this preferred embodiment is capable of hoisting and/or pulling approximately 600 lbs., but it is understood that the load capacity of frame 14 and winch 18 can be increased or decreased depending upon the desired application. Winch 18 can also include its own source of power or alternatively be coupled to an external source of power 59 and be electrically operated, for example (See FIGS. 5B and 5C). Similarly, receptacle 40 is not limited to winching solely along the axis-X as receptacle 40 in this preferred embodiment has four sides that mate with a four sided post 55 that can be directed for winching approximately along axis-Z, for example, at a reduced pulling rating.

In an alternative embodiment of winch 18, the position of the winch mechanism can be varied relative to bottom 32. For example, post 55 can be telescoped and extendable such to vary the height of the winch mechanism. Similarly, the winch mechanism can be configured to be disconnected from post 55 and reconnected at alternative predetermined locations along the length post 55. Similarly, post 55 can have a track along which the winch mechanism can be moved and locked to vary the height of the winch mechanism. In one preferred embodiment, the winch mechanism can vary in height between approximately six inches and three feet above bottom 32.

Varying the height of the winch mechanism relative to frame 14 or bottom 32 advantageously allows winch 18 to meet the needs of different loads. The adjusting of the height of the winch mechanism accommodates the matching of the height of the winch mechanism to a given height for an object being loaded. Factors for varying the height to different object include increasing the hosting force and pulling or restraining force of the winch mechanism with a relatively short height of the winch mechanism and center of gravity of considerations for pulling or hoisting the object, for example. In still another preferred embodiment, post 55 has an arcuate or angled shape that extends at least partially over bottom 32 such that the winch mechanism has an improved capability for vertical lift.

Tilt rack 10 is preferably made of heavy gauge steel with a black powder coat finish. Alternative materials can include wood, other metal alloys and composite materials. Frame 14 of tilt rack 10 can come in a variety of sizes. Examples of the length of first frame member 28 and second frame member 30, respectively include 20×60 inches, 30×60 inches and 36×92 inches. In this preferred embodiment, tilt rack 10 has an 800 pound load capacity in order to address the needs of heavy duty applications such those required by many commercial, industrial and recreational vehicles.

As shown in FIGS. 1, 2 and 4, during the transportation of tilt rack 10, winch 18 is preferably transported in the stowed position and secured by the combination of receptacle 42, channel 50, rod 52 and pin 54. Winch 18 can also be removed from tilt rack 10 and stored in the vehicle, for example. Tilt rack 10 is constructed to maintain a relatively high ground clearance even when winch 18 is in the stowed position.

Tilt rack 10 returns to the first position automatically due to the central position of beam 12 and offset of hinge 16 relative to frame 14. Spring rod 39 extends through proximal flange 26 into aperture 38a of proximal flange 38 in the first position of tilt rack 10. Distal flange 24 of post 12 and distal flange 36 of frame 14 are positioned in close overlapping relation in the first position of tilt rack 10 and provide an alignment mechanism to minimize any distortion of the structure of tilt rack 10. For example, frame 14 can undergo sizable load moments during loading and during transportation that will flex frame 14. The close fitting, overlapping and stiff nature of flanges 24 and 36 throughout the range of movement of frame 14 relative to beam 12 assists tilt rack 10 in maintaining the alignment of frame 14 and prevent yawing of frame 14 relative to post 12.

Referring now to FIGS. 1 and 5A, tilt rack 10 in the second position has one frame member 28 in proximity to the ground and the opposing frame member 28 is elevated from the ground and advantageously includes winch 18. In this preferred embodiment, frame 14 has rotated approximately forty-five degrees relative to the first position of tilt rack 10. Tilt rack moves from the first position to the second position by the withdrawing of spring rod 39 from engagement with aperture 38a of flange 38, rotating frame 14 about hinge 16 and releasing spring rod 39 for insertion into aperture 38b of flange 38.

Distal flange 24 of post 12 and distal flange 36 of frame 14 retain their close overlapping relation in the second position and provide stability with proximal flanges 26 and 38 to frame 14 relative to post 12 during loading and unloading. Flanges 24 and 36 can be positioned in close proximity or direct sliding contact. Distal flange 24 and distal flange 36 can also include one or more apertures 38c that are aligned with the different positions of tilt rack 10. The apertures 38c can be advantageously employed to insert a security mechanism such as a lock to fix tilt rack 10 in the selected position and prevent tampering.

In one preferred embodiment, frame 10 in the second position of tilt rack 10 can have multiple angular positions defined by apertures in flange 38 that include, for example, approximately thirty and approximately forty-five degrees from the first position of tilt rack 10. The angle of frame 10 in the second position is a variable that can depend upon the desired application and include multiple angular positions. For example, in one preferred embodiment, factors such as the length of second members 30 and the position of hinge 16 on frame 14. Beam 12 provides a limit or stop for the rotation of frame 14 and thus frame 14 can rotate approximately ninety degrees from the first position of tilt rack 10.

Winch 18 is removed from the stowed position by forcing pin 54 against its bias from engagement with rod 52 and sliding rod 52 from engagement with flanges 48 of channel 50 and winch 18. Winch 18 can then be withdrawn from receptacle 42 and inserted into aperture 44 of receptacle 40 for operational use. Rod 52 is preferably inserted through receptacle 40 and the first end portion 56 of post 55 to secure winch 18 in the operational position. Pin 54 is then employed to secure rod 52 in position. Hook 60 can then be connected for the pulling and/or hoisting of a load onto frame 14.

Figure 6:
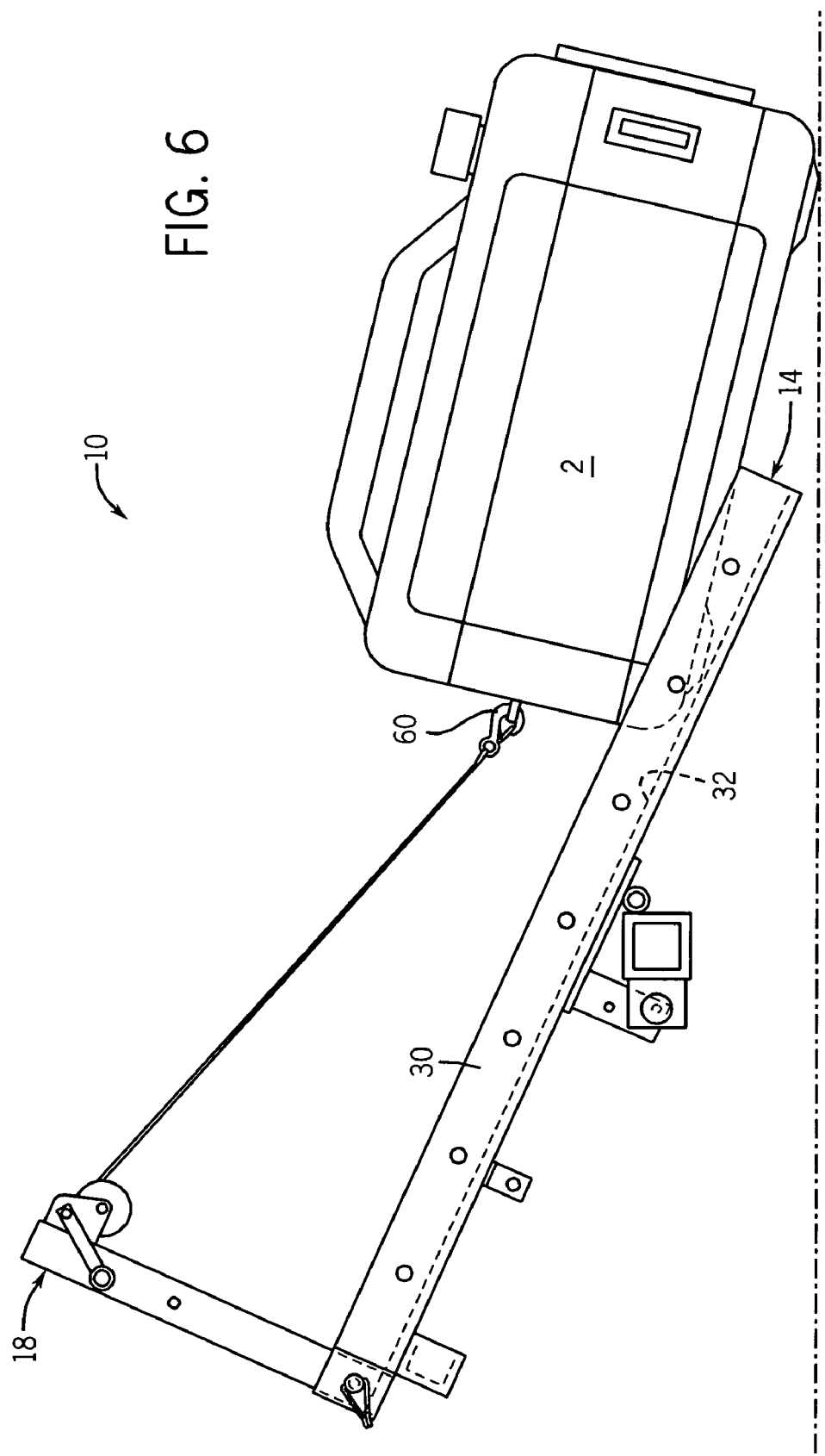
FIG. 6 is the front view of the tilt rack of FIG. 5 loading an exemplary object using the winch.

As shown in FIG. 6, tilt rack 10 is in the second position with hook 60 of winch 18 connected to and pulling and/or hoisting an exemplary article 2 onto bottom 32 of frame 14. Exemplary article 2 can be a piece of equipment such as a generator or a powered wheelchair or alternatively game.

Figure 7:
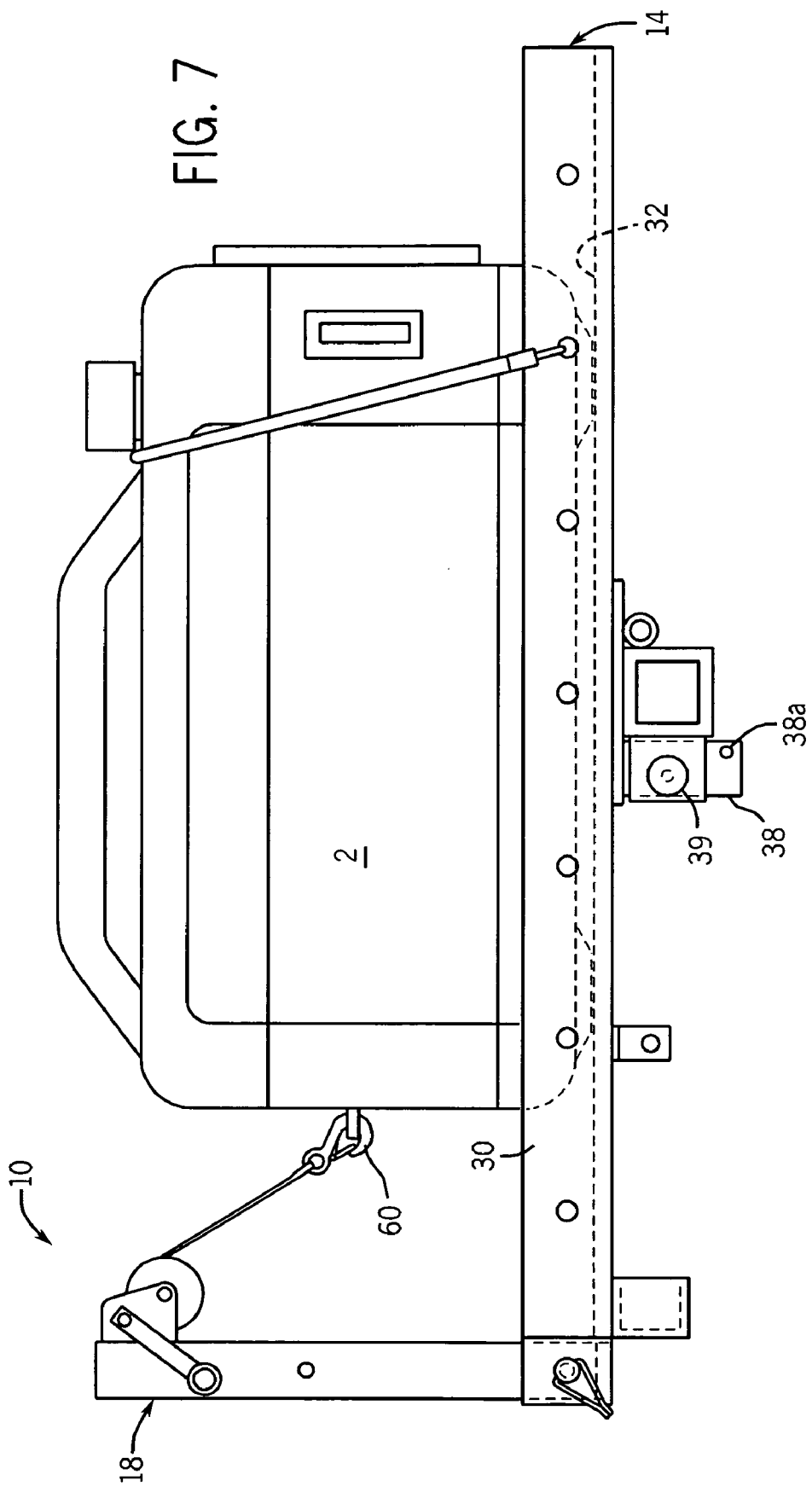
FIG. 7 is the front view of the tilt rack of FIG. 1 with the exemplary object loaded on the tilt rack.

Referring now to FIG. 7, once exemplary article 2 is positioned at a desired location on frame 14, spring rod 39 can be removed from its connection with aperture 38a and frame 14 is rotated to the first position of tilt rack 10. The bias of spring rod 39 can then automatically seat the rod through aperture 38b of flange 38 to secure tilt rack 10 in the first position. Winch 18 can also be employed to tie down or fix article 2 in position on bottom 32 of frame 14. It is understood that that while article 2 is shown positioned on bottom 32, one or more articles 2 can be directly positioned on frame members 28 and 30 without being positioned directly on bottom 32.

Figure 8:
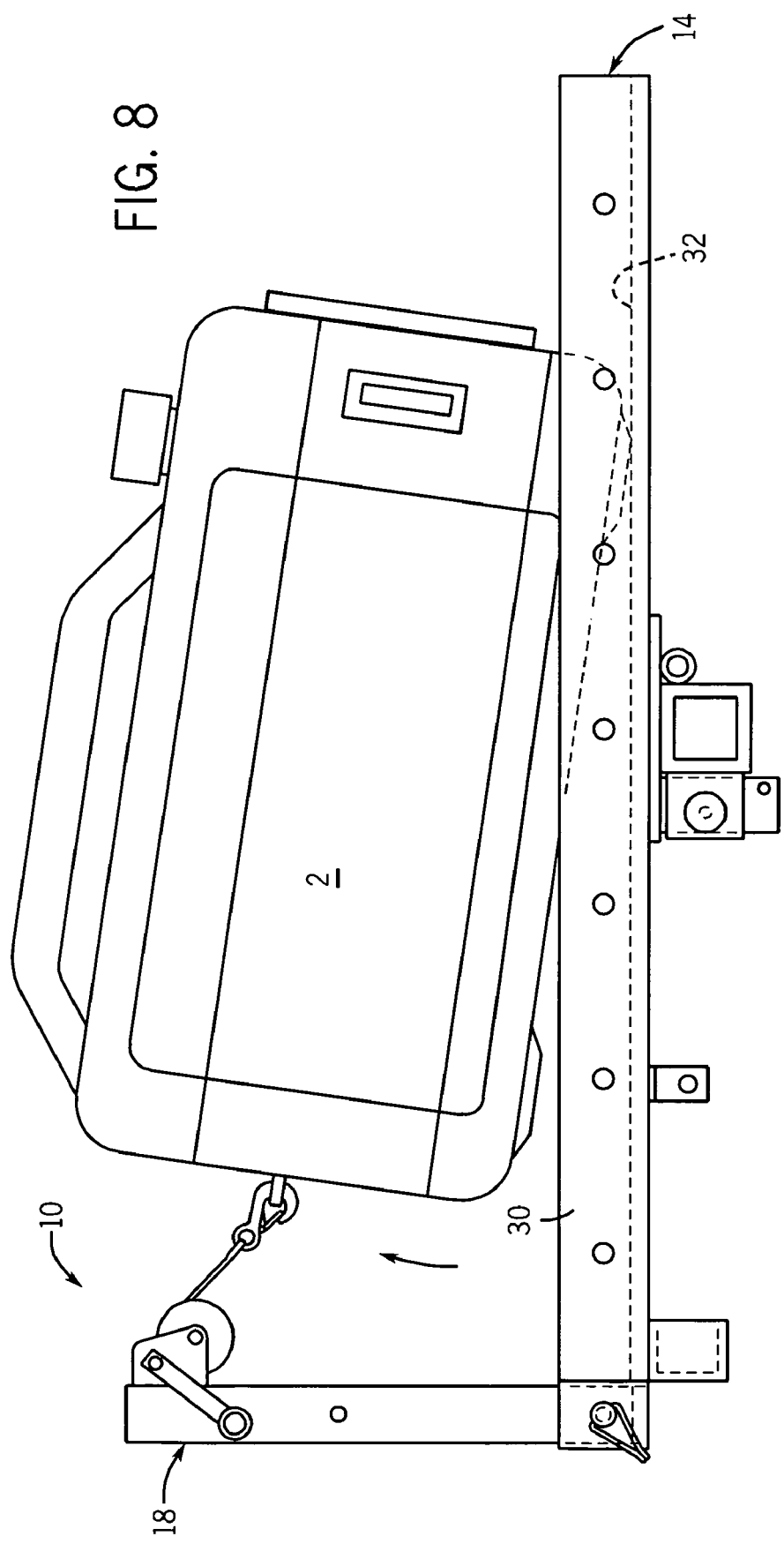
FIG. 8 is the front view of the tilt rack of FIG. 7 with the exemplary object being lifted by the winch.

As shown in FIGS. 8 and 9, winch 18 can be employed to rotate and/or reposition article 2 on bottom 32. In this example, article 2 is rotated approximately ninety degrees with the assistance of winch 18. Winch 18 and hook 60 can alternatively advantageously raise and hold equipment in an at least partially elevated position on frame 14 that can provide ease of access to areas of article 2 for maintenance, for example, that otherwise might not be readily accessible.

In the preceding specification, the present disclosure has been described with reference to specific exemplary embodiments thereof. It will be evident, however, that various modifications, combinations and changes may be made thereto without departing from the broader spirit and scope of the invention as set forth in the claims that follow. For example, it is understood that the size, material, angle and structure of tilt rack 10 can vary from the present rectangular angle iron frame, for example. In addition, though the present invention is described in terms of a series of embodiments, each embodiment of the present invention can combine one or more novel features of the other embodiments. The specification and drawings are accordingly to be regarded in an illustrative manner rather than a restrictive sense.

What is claimed is:

1. A tilt rack that is adapted to couple with a hitch of a vehicle, the vehicle positioned on the ground, the tilt rack comprises:

an elongate beam adapted to couple with a hitch of a vehicle;

a frame that includes opposed support members that define a perimeter and connect to a bottom; the frame approximately defines a plane, a receptacle connected to a first portion of one of the support members of the frame;

a winch assembly that includes a post and a winch mechanism, the post has a first end portion and an opposed second end portion, the winch mechanism connected in proximity to the second end portion of the post, the winch has an operational position and a stowed position, the operational position of the winch includes the first end portion of the post connected to the receptacle and the post extending approximately perpendicular to and above the bottom, the winch mechanism positioned for providing a pulling force approximately perpendicular to the beam and the winch mechanism positioned for providing an approximately vertical hoisting force, the winch selectively removable from the frame, the winch removable from the receptacle, the winch secured in the stowed position in a second receptacle and a channel, the second receptacle and channel positioned under the frame;

a hinge that is approximately aligned with the beam that directly connects the beam and the frame for the rotation of the frame relative to the beam;

a first position wherein the frame is approximately aligned with the ground;

a second position wherein the frame is tilted from the first position about the hinge and relative to the beam such that the portion of the frame opposite the first portion of the frame is in proximity to the ground;

a locking mechanism that includes a first proximal flange connected to the beam and a second proximal flange connected to the frame, the first proximal flange has a first aperture and the second proximal flange has at least two apertures, a rod positionable through the aperture of the first proximal flange and into one of the apertures of the second proximal flange to fix the position of the frame relative to the beam.

2. The tilt rack of claim 1, wherein the frame includes a plate that is approximately aligned with the beam and extends between the frame members, the plate directly connected to the hinge and the hinge has a length that extends approximately between the frame members.

3. The tilt rack of claim 1, wherein the winch mechanism is adjustable in height above the plane defined by the bottom.

4. The tilt rack of claim 1, wherein the receptacle includes a hinge that connects to the post of the winch and the winch rotates between the operational position and the stowed position.

5. The tilt rack of claim 1, wherein the winch can be coupled to an external source of electrical power and operated electrically.

6. A tilt rack that is adapted to couple with a hitch of a vehicle, the vehicle positioned on the ground, the tilt rack comprises:

an elongate beam adapted to couple with a hitch of a vehicle;

a frame that includes a first side member opposed to a second side member, the side members connect a front and a back member, the side members have a first length and the front and back member have a second length, the first length of the side members is less than the length of the front member and the back member, the frame has an approximately rectangular shape, the frame includes a receptacle connected to a first side member, the frame includes a bottom connected to the members, the frame defines a plane;

a winch assembly that includes a post and a winch mechanism, the post has a first end portion and an opposed second end portion, the winch mechanism movable along the length of the elongate post, an operational position of the winch wherein the post extends approximately perpendicular to and above the bottom, the winch mechanism positioned above the plane of the frame for providing a pulling force approximately perpendicular to the beam and the winch mechanism positioned for providing a vertical hoisting force, the first end portion of the post pivotally connected to the receptacle and the winch selectively pivotable between the operational position and a stowed position, the connection of the winch in the stowed position to the frame includes a channel that is connected to the underside of the frame, the channel including a locking mechanism;

a hinge that is approximately aligned with the beam and directly connects the beam and the plate of the frame for the rotation of the frame relative to the beam;

a first position wherein the frame is approximately aligned with the ground;

a second position wherein the frame is tilted from the first position about the hinge and relative to the beam such that the second side member is in proximity to the ground and the first side member is elevated; and a locking mechanism that includes a first proximal flange connected to the beam and a second proximal flange connected to the frame, the first proximal flange has a first aperture and the second proximal flange has at least two apertures, a rod biased to an extended position, the rod selectively extendable through the aperture of the first proximal flange and into one of the apertures of the second proximal flange to fix the position of the frame relative to the beam.

7. The tilt rack of claim 6, wherein an alignment mechanism for the frame includes a first distal flange and a second distal flange, the first distal flange connected to the beam and the second distal flange connected to the frame, the first distal flange directly facing the second distal flange, the distal flanges approximately aligned perpendicular to the hinge and positioned in sliding relation such that the flanges are approximately in continuous contact between the first and second positions.

8. The tilt rack of claim 7, wherein the distal flanges include at least one aperture that can receive a detachable security mechanism.

9. The tilt rack of claim 6, wherein the connection between the first receptacle and the post of the winch also accommodates approximately aligning the winch with the axis defined by the beam for providing a pulling force approximately aligned with the beam and an approximately vertical hoisting force.

10. A tilt rack that is adapted to couple with a hitch of a vehicle, the vehicle positioned on the ground, the tilt rack comprises:

an elongate beam adapted to couple with a hitch of a vehicle;

a frame that includes a first side member opposed to a second side member, the side members connect a front and a back member, the side members have a first length and the front and back member have a second length, the first length of the side members is less than the length of the front member and the back member, the frame has an approximately rectangular shape, the frame includes a receptacle connected to a first side member, the frame includes a bottom connected to the members, the frame defines a plane;

a winch assembly that includes a post and a winch mechanism, the post has a first end portion and an opposed second end portion, the winch mechanism movable along the length of the elongate post, an operational position of the winch wherein the post extends approximately perpendicular to and above the bottom, the winch mechanism positioned above the plane of the frame for providing a pulling force approximately perpendicular to the beam and the winch mechanism positioned for providing a vertical hoisting force, the first end portion of the post pivotally connected to the receptacle and the winch selectively pivotable between the operational position and a stowed position, the winch received by a channel connected to the underside of the frame in the stowed position, the receptacle and channel include automatic locking mechanisms such that the winch is automatically locked in position upon being received into the receptacle and channel;

a hinge that is approximately aligned with the beam and directly connects the beam and the plate of the frame for the rotation of the frame relative to the beam;

a first position wherein the frame is approximately aligned with the ground;

a second position wherein the frame is tilted from the first position about the hinge and relative to the beam such that the second side member is in proximity to the ground and the first side member is elevated; and a locking mechanism that includes a first proximal flange connected to the beam and a second proximal flange connected to the frame the first proximal flange has a first aperture and the second proximal flange has at least two apertures, a rod biased to an extended position, the rod selectively extendable through the aperture of the first proximal flange and into one of the apertures of the second proximal flange to fix the position of the frame relative to the beam.

11. The tilt rack of claim 10, wherein the frame includes a first distal flange and a second distal flange, the first distal flange connected to the beam and the second distal flange connected to the frame, the first distal flange and the second distal flange approximately aligned perpendicular to the hinge and positioned in close proximity.

12. The tilt rack of claim 10, wherein the receptacle includes a hinge and the winch rotates about the hinge from the operational position to the stowed position, the stowed position being under the frame.

13. The tilt rack of claim 10, wherein the winch includes a locking mechanism that secures the winch in the operational position and the stowed position.

14. The tilt rack of claim 10, wherein the locking mechanism of the winch automatically engages upon positioning the winch in the operational position and the stowed position.

15. The tilt rack of claim 10, wherein the connection between the first receptacle and the post of the winch accommodates approximately aligning the winch with the axis defined by the beam for providing a pulling force approximately aligned with the beam and an approximately vertical hoisting force.

16. The tilt rack of claim 10, wherein the post is angled transverse to a vertical axis when the tilt rack is in the first position and can be selectively positioned to extend directly over at least a portion of the frame.

* * * * *